United States Patent
Bell

(10) Patent No.: US 9,655,311 B1
(45) Date of Patent: May 23, 2017

(54) ABSORBENT RAIN SENSOR WITH RETENTION BASIN

(71) Applicant: Hunter Industries, Inc., San Marcos, CA (US)

(72) Inventor: James A. Bell, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 550 days.

(21) Appl. No.: 14/102,276

(22) Filed: Dec. 10, 2013

(51) Int. Cl.
*A01G 25/16* (2006.01)

(52) U.S. Cl.
CPC .................................. *A01G 25/16* (2013.01)

(58) Field of Classification Search
CPC ............. A01G 25/167; A01K 2217/05; A01K 2217/075; C07K 14/47; G01N 2333/4709; G01N 2500/00; G01N 2800/2828; G01N 33/6896; H01H 35/42
See application file for complete search history.

(56) References Cited

U.S. PATENT DOCUMENTS

| | | |
|---|---|---|
| 2,688,056 A | 8/1954 | Kettering et al. |
| 3,808,385 A | 4/1974 | Klinefelter |
| 4,107,604 A | 8/1978 | Bernier |
| 4,313,042 A | 1/1982 | Ehrhart |
| 4,655,076 A | 4/1987 | Weihe et al. |
| 4,862,701 A | 9/1989 | Small et al. |
| 5,101,083 A | 3/1992 | Tyler et al. |
| 5,836,339 A | 11/1998 | Klever et al. |
| 5,868,316 A | 2/1999 | Scott |
| 5,979,482 A | 11/1999 | Scott |
| 5,979,863 A | 11/1999 | Lousberg |
| 5,996,608 A | 12/1999 | Hunter et al. |
| 6,088,621 A | 7/2000 | Woytowitz et al. |
| 6,158,278 A | 12/2000 | Klinefelter |
| 6,401,530 B1 | 6/2002 | Roman |
| 6,452,499 B1 | 9/2002 | Runge et al. |
| 6,570,109 B2 | 5/2003 | Klinefelter et al. |
| 6,842,667 B2 | 1/2005 | Beutler et al. |
| 6,977,351 B1 | 12/2005 | Woytowitz |
| 7,225,058 B1 | 5/2007 | Porter |
| 7,243,005 B1 | 7/2007 | Beutler et al. |
| 7,289,886 B1 | 10/2007 | Woytowitz |
| D580,373 S | 11/2008 | Stange et al. |
| 7,457,687 B1 | 11/2008 | Porter |
| 7,503,346 B1 | 3/2009 | Clark |
| 7,613,547 B1 | 11/2009 | Woytowitz |
| D607,759 S | 1/2010 | Woytowitz et al. |

(Continued)

OTHER PUBLICATIONS

Hunter Industry Incorporated, Hunter Product Information—Sensors, 2005, p. 13-19.*

*Primary Examiner* — Mohammad Ali
*Assistant Examiner* — John Park
(74) *Attorney, Agent, or Firm* — Knobbe Martens Olson & Bear, LLP

(57) ABSTRACT

A rain sensor can be configured to shut off one or more irrigation devices during and/or after a period of rainfall. The rain sensor can include a moisture basin mounted therein. The moisture basin houses an absorbent element configured to expand in at least one direction when wetted. Expansion of the absorbent element can activate a signal actuator to generate a shut off signal to one or more irrigation devices. The moisture basin can retain excess moisture when the absorbent element is fully saturated.

20 Claims, 10 Drawing Sheets

(56) References Cited

U.S. PATENT DOCUMENTS

| | | |
|---|---|---|
| D607,847 S | 1/2010 | Elliott et al. |
| 7,665,713 B1 | 2/2010 | Clark |
| D612,813 S | 3/2010 | Paul |
| D613,255 S | 4/2010 | Paul |
| 7,772,726 B1 | 8/2010 | Porter et al. |
| 7,806,382 B1 | 10/2010 | Palumbo et al. |
| 7,853,363 B1 | 12/2010 | Porter et al. |
| 7,891,370 B1 | 2/2011 | Stange |
| 7,899,581 B1 | 3/2011 | Woytowitz |
| 7,912,588 B2 | 3/2011 | Runge et al. |
| D638,914 S | 5/2011 | Schmuckle |
| 7,949,433 B2 | 5/2011 | Hern et al. |
| D643,093 S | 8/2011 | Schmuckle et al. |
| D653,219 S | 1/2012 | Woytowitz et al. |
| 8,225,810 B2 | 7/2012 | Blanchard |
| D668,231 S | 10/2012 | Paul et al. |
| 8,297,314 B2 | 10/2012 | Clark et al. |
| 8,371,325 B1 | 2/2013 | Grizzle |
| 8,498,099 B1 | 7/2013 | Schmuckle |
| D691,967 S | 10/2013 | Chun et al. |
| D691,968 S | 10/2013 | Schmuckle et al. |
| 8,606,415 B1 | 12/2013 | Woytowitz et al. |
| 8,744,773 B2 | 6/2014 | Woytowitz et al. |
| 2003/0079974 A1* | 5/2003 | Klinefelter ........... A01G 25/167 200/61.04 |
| 2005/0055106 A1 | 3/2005 | Beutler et al. |
| 2006/0100747 A1* | 5/2006 | Runge .................. A01G 25/167 700/284 |
| 2010/0030476 A1 | 2/2010 | Woytowitz et al. |
| 2011/0224836 A1* | 9/2011 | Hern .................... A01G 25/167 700/284 |
| 2011/0238228 A1 | 9/2011 | Woytowitz et al. |
| 2011/0288775 A1* | 11/2011 | Woytowitz .............. G01W 1/14 702/3 |
| 2011/0297757 A1 | 12/2011 | Schmuckle |
| 2012/0274219 A1 | 11/2012 | Woytowitz et al. |
| 2013/0161411 A1 | 6/2013 | Grizzle |

* cited by examiner

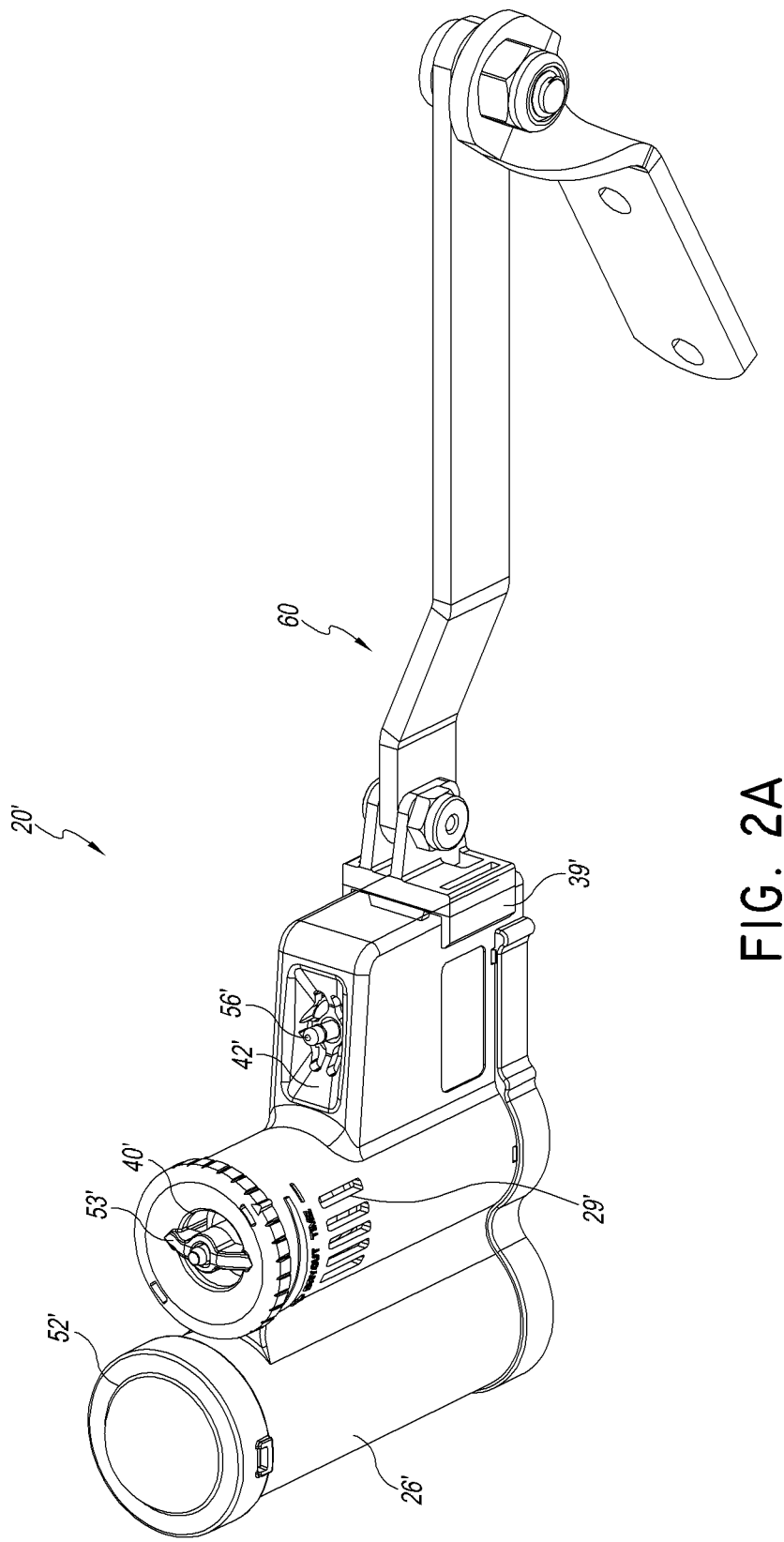

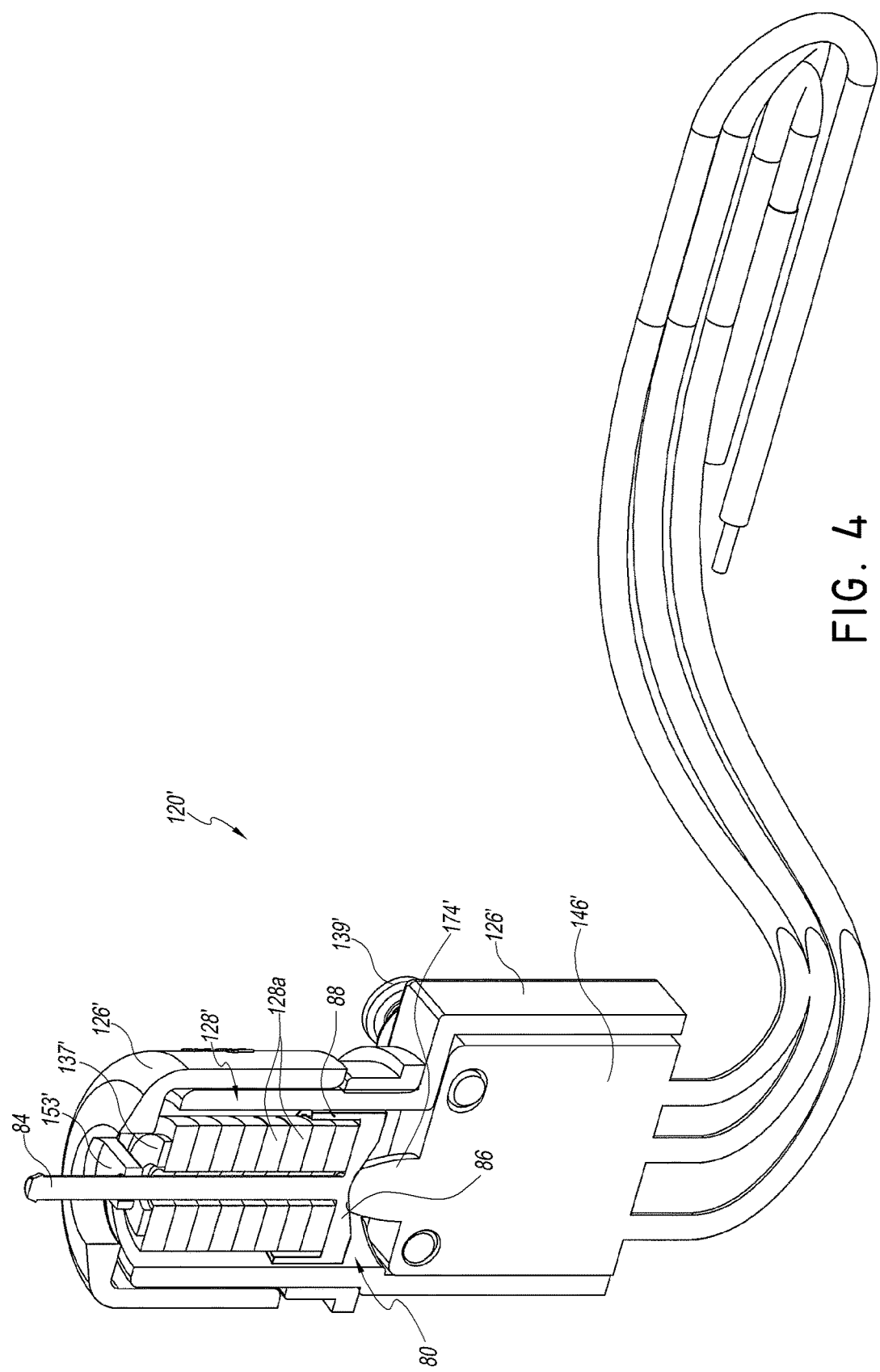

ABSORBENT RAIN SENSOR WITH RETENTION BASIN

TECHNICAL FIELD

The present disclosure relates to irrigation of turf and/or landscaping, and more particularly, to sensors that detect rainfall and send signals to irrigation controllers.

BACKGROUND

Electronic irrigation controllers typically include a microprocessor or micro-controller that executes a stored watering program to turn a plurality of solenoid actuated valves ON and OFF. The valves deliver water to sprinklers that supply water to turf and/or other landscaping. Electro-mechanical rain sensors are often connected to irrigation controllers to suspend watering during periods of rainfall.

In a first type of conventional rain sensor, a bucket collects a certain amount of rain water, and then automatically tips so that the bucket is emptied. The process of filling and emptying the bucket continues as long as it is raining. The bucket is typically calibrated to empty after a predetermined amount of rain, for instance, one-tenth of an inch. A set of switch contacts close every time the bucket tips, generating one pulse for every one-tenth of an inch of rainfall. By way of example, one and one-half inches of rain would be indicated by fifteen pulses supplied by the rain bucket switch.

In a second type of conventional rain sensor, rain drops are directed to a common location where they are individually counted. This is often done by directing water droplets over closely spaced apart electrodes and detecting a conductive path through the individual water droplets. In this type of rain sensor one droplet is represented by one pulse. The size of the receptacle that catches the rain drops results in a certain number of droplets equating to a predetermined amount of rainfall.

In a third type of sensor a plurality of discs made of a hygroscopic material are mounted in a housing that collects rainfall and deposits it on the hygroscopic material through slots or other apertures formed in the housing. The discs expand as they absorb moisture, causing a two-state electro-mechanical switch to change states once the discs have generated a predetermined amount of movement via physical expansion of the same. The third type of rain sensor is highly reliable and its simplicity and lower cost has resulted in its successful commercialization over many years.

SUMMARY

According to some embodiments, an irrigation control system can include a control unit and a rain sensor in communication with the control unit. In some embodiments, the rain sensor includes a sensor housing. The rain sensor can include a first moisture-absorbent element within the sensor housing. The first moisture-absorbent element can be in communication with ambient via a first aperture in the sensor housing. In some embodiments, the first moisture-absorbent element is configured to expand to a wet state from a dry state as the first moisture-absorbent element absorbs liquid. The first moisture-absorbent element can have a first drying rate. In some embodiments, the rain sensor includes a moisture basin within the sensor housing. The moisture basin can have a liquid-impervious base and one or more liquid-impervious sidewalls extending upward from the base. In some embodiments, the liquid-impervious base and one or more liquid-impervious sidewalls form a basin volume. In some embodiments, the rain sensor includes a second moisture-absorbent element within the sensor housing. The second moisture-absorbent element can be positioned at least partially within the basin volume. In some embodiments, the second moisture-absorbent element is in communication with ambient via a second aperture in the sensor housing. The second moisture-absorbent element can be configured to expand when transitioned from a dry state to a wet state. In some embodiments, the second moisture-absorbent element has a second drying rate slower than the first drying rate. In some cases, the rain sensor includes a signal actuator configured to transition between a first position and a second position. The signal actuator can be biased to the first position. In some embodiments, the signal actuator transitions to the second position when one or more of the first moisture-absorbent element and the second moisture-absorbent element is in its wet state. In some embodiments, the moisture basin is configured to store a volume of liquid in excess of the liquid within the fully saturated second moisture-absorbent element, the volume of excess liquid in contact with at least a portion of the second moisture-absorbent element.

In some embodiments, the one or more liquid-impervious sidewalls have a sidewall height. In some cases, the second moisture-absorbent element has an element height extending between the base of the moisture basin and an upper retaining structure. In some embodiments, when the second moisture-absorbent element is dry, the sidewall height is less than forty percent the element height and greater than five percent the element height. In some embodiments, the second moisture-absorbent element includes a plurality of stacked moisture-absorbent discs. In some cases, the one or more liquid-impervious sidewalls have a sidewall height. The second moisture-absorbent element can have an element height extending between the base of the moisture basin and an upper retaining structure. In some embodiments the sidewall height is greater than ten percent the element height and less than sixty percent the element height when the second moisture-absorbent element is dry. In some cases, the one or more liquid-impervious sidewalls include one or more notches, the one or more notches in an outer surface of the one or more liquid-impervious sidewalls to facilitate drainage of overflow liquid from the moisture basin. In some embodiments, the one or more notches are in an outer surface of the one or more liquid-impervious sidewalls to facilitate drainage of overflow liquid from the moisture basin. The moisture basin can include a central post extending upward from the liquid-impervious base, the second moisture-absorbent element mounted on the central post.

According to some variants, an irrigation control sensor can include a sensor housing. The irrigation control sensor can include a signal actuator configured to transition between a first position and a second position. In some embodiments, the signal actuator is biased to the first position. The irrigation control sensor can include a moisture accumulator cup mounted in the sensor housing and defining a accumulator volume. In some embodiments, the irrigation control sensor includes a moisture-absorbent element mounted in the sensor housing and positioned at least partially within the accumulator volume. The moisture-absorbent element can be in communication with ambient via an aperture in the sensor housing. In some embodiments, the moisture-absorbent element is configured to expand as the moisture-absorbent element absorbs liquid. In some embodiments, the signal actuator transitions from the first position to the second position as the second moisture-absorbent element expands. In some embodiments, the moisture accumulator cup retains a volume of liquid outside the moisture-absorbent element when the moisture-absorbent element reaches a maximum liquid absorption, the volume of liquid in contact with the moisture-absorbent element.

In some embodiments, the moisture accumulator cup has one or more sidewalls having a sidewall height. The sidewall height can be less fifty percent of a height of the moisture-absorbent element when the moisture-absorbent element is dry. In some embodiments, the sensor includes a resilient structure configured to bias the moisture accumulator cup in an upward direction. In some cases, the sensor includes a resilient structure, the moisture-absorbent element moving the moisture accumulator cup in an expansion direction as the moisture-absorbent element absorbs liquid, the resilient structure biasing the moisture accumulator cup in a direction substantially opposite the expansion direction. In some embodiments, the moisture accumulator cup includes a cup base having a substantially flat upper surface, the cup base being liquid-impervious.

According to some variants, a rain sensor includes a sensor housing. The rain sensor can include a signal actuator configured to transition between a first position and a second position. In some embodiments, the signal actuator is biased to the first position. The rain sensor can include a moisture accumulator cup defining an accumulator volume and mounted in the sensor housing. The moisture accumulator cup can be configured to hold a volume of liquid within the accumulator volume. In some embodiments, the rain sensor include a moisture-absorbent element mounted in the sensor housing and positioned at least partially within the accumulator volume. The moisture-absorbent element can be in communication with ambient via an aperture in the sensor housing. In some embodiments, the moisture-absorbent element is configured to expand when transitioned from a dry state to a wet state. The signal actuator can transition from the first position to the second position as the moisture-absorbent element is transitioned to the wet state from the dry state. In some embodiments, the moisture accumulator cup retains the volume of liquid within the accumulator volume and outside the moisture-absorbent element when liquid is introduced to the moisture-absorbent element in the wet state, the volume of liquid in contact with at least a portion of the moisture-absorbent element.

In some embodiments, the signal actuator comprises a hinged arm attached to the sensor housing at a hinge point, the hinged arm biased upward by a resilient element. In some case, the moisture accumulator cup is moved into contact with the hinged arm when the moisture-absorbent element expands. In some embodiments, the signal actuator comprises a permanent magnet. In some cases, the permanent magnet moves relative to a Hall effect sensor when the signal actuator is transitioned between the first position and the second position, movement of the permanent magnet affecting a signal generated by the Hall effect sensor. In some embodiments the permanent magnet moves relative to a reed switch when the signal actuator is transitioned between the first position and the second position, movement of the permanent magnet opening and closing the reed switch. The signal actuator can be fixedly attached to the accumulator cup.

According to some variants, a rain sensor can include a sensor housing. The rain sensor can include a moisture accumulator cup defining an accumulator volume and mounted in the sensor housing. The moisture accumulator cup can be configured to hold a volume of liquid within the accumulator volume. In some embodiments, the rain sensor includes a moisture-absorbent element mounted in the sensor housing and positioned at least partially within the accumulator volume. The moisture-absorbent element can be in communication with ambient via an aperture in the sensor housing. In some embodiments, the moisture-absorbent element is configured to expand when transitioned from a dry state to a wet state. The moisture accumulator cup can be configured to exert a force upon a signal actuator as the moisture-absorbent element is transitioned to the wet state from the dry state. In some embodiments, the moisture accumulator cup retains the volume of liquid within the accumulator volume and outside the moisture-absorbent element when liquid is introduced to the moisture-absorbent element in the wet state, the volume of liquid in contact with at least a portion of the moisture-absorbent element.

BRIEF DESCRIPTION OF THE DRAWINGS

Various embodiments are depicted in the accompanying drawings for illustrative purposes, and should in no way be interpreted as limiting the scope of the embodiments. In addition, various features of different disclosed embodiments can be combined to form additional embodiments, which are part of this disclosure.

FIG. 2A is a perspective view of another embodiment of a rain sensor.

FIG. 4 is a perspective cross-section view of another embodiment of a rain sensor.

DETAILED DESCRIPTION

Figure 1A:
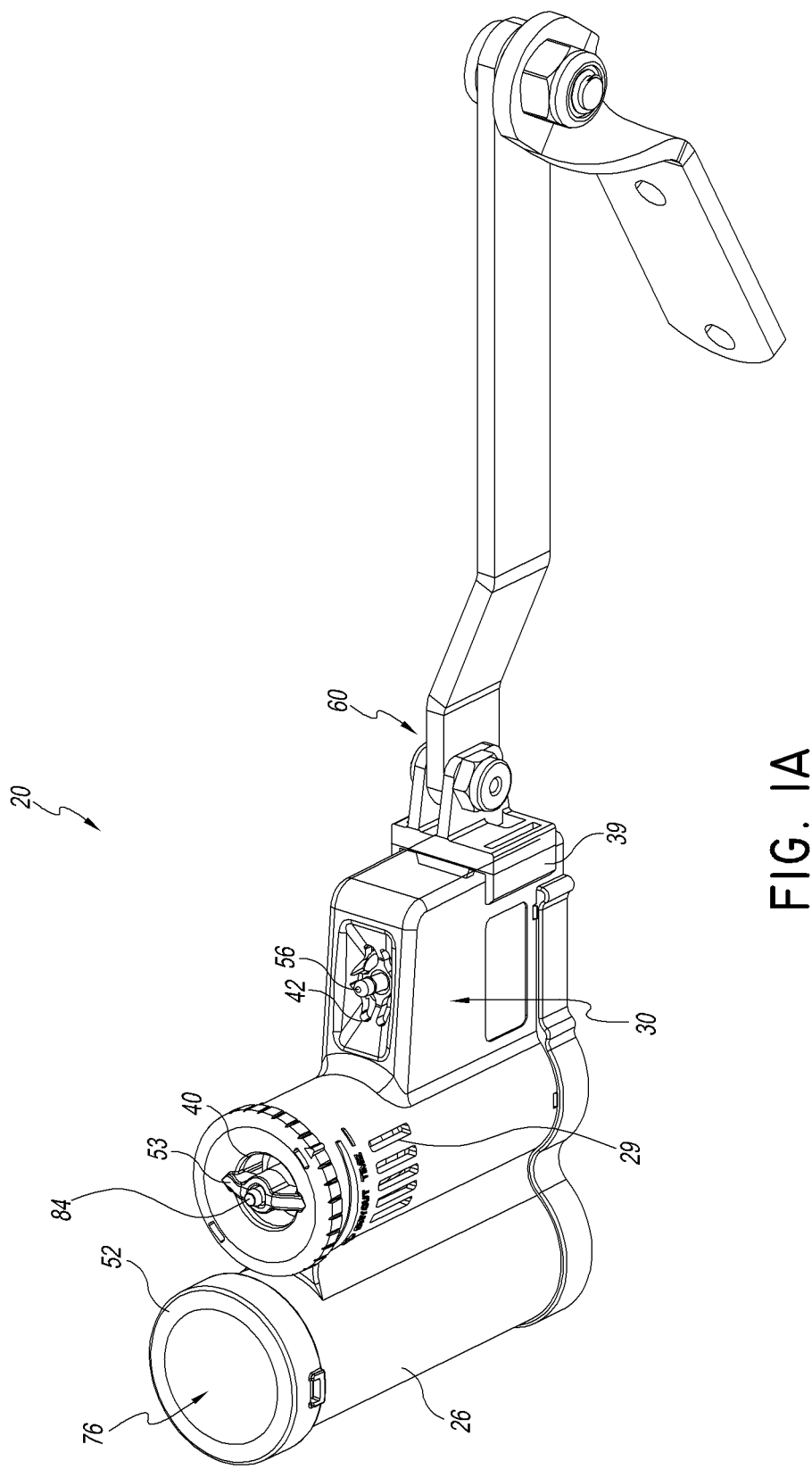
FIG. 1A is a perspective view of an embodiment of a rain sensor.

Weather sensors (e.g., rain sensors) can be used in conjunction with an irrigation system and/or controller to shut off one or more irrigation devices during and/or after a period of rainfall. The rain sensor can include a sensor housing. In some applications, the rain sensor can include a moisture basin mounted therein. An absorbent element configured to expand in at least one direction when wetted can be positioned at least partly within the moisture basin. Expansion of the absorbent element can activate a signal actuator to generate a shut off signal to one or more irrigation devices. For example, expansion of the absorption element can move a portion of the moisture basin. Movement of the moisture basin can directly (e.g., via direct contact) or indirectly (e.g., via movement of an intermediate structure) actuate a signal generator to send a shut off signal. The moisture basin can retain excess moisture when the absorbent element is fully saturated.

It is usually desirable for irrigation to be interrupted as soon as possible upon commencement of actual rainfall. To accomplish this, a rain sensor of the present disclosure can generate a shut off command telling an irrigation controller to suspend irrigation once a hygroscopic element has swelled a predetermined minimum amount. For example, the rain sensor can generate a shut off command when the hygroscopic element swells a minimum amount in response to absorption of moisture. In some embodiments, the rain sensor can maintain the shut off command until the hygroscopic element contracts (e.g., dries) to a predetermined size.

In the event of fog or heavy moisture accumulation in the rain sensor, the same amount of swelling of the hygroscopic material may take place at a much slower rate. In some embodiments, a rain sensor can monitor the rate of change of swelling of the hygroscopic material. By monitoring the rate of change of the swelling, a rain sensor of the present disclosure can determine that the detected rate of expansion is so slow that it is not caused by rainfall.

In some embodiments, the rain sensor includes more than one hygroscopic element. For example, the rain sensor can include a first hygroscopic element that rapidly expands in response to moisture absorption. A second hygroscopic element can expand more slowly than the first hygroscopic element. In some embodiments, the second hygroscopic element contracts (e.g., dries) more slowly than the first hygroscopic element.

In some instances, the rain sensor can continue to monitor the rate of change and continue to modify the trip point where it can determine with a high degree of certainty that a rain event has occurred. For example, there can be a point at which the rain sensor of the present disclosure senses so much moisture that it sends a command to the irrigation controller which causes it to suspend watering because it is assumed that the heavy moisture that was swelling the absorbent element slowly has turned to rain, or provided enough moisture to the landscape to justify a rain shut-off command. In some embodiments, the rain sensor reacts quickly in a rain event and avoids false shut off messages due to fog, heavy moisture accumulation or a very light sprinkle of rain.

As illustrated in FIG. 1A, a rain sensor 20 can include a housing 26. The housing 26 can include one or more attachment features (e.g., slots 39) to facilitate attachment of the rain sensor 20 to a mounting unit (e.g., mounting bracket assembly 60). The housing 26 can include one or more openings (e.g., apertures 40, 42). The one or more openings can transfer moisture from an exterior of the housing 26 to one or more internal components of the housing 26. For example, the openings can permit rainfall to access one or more hygroscopic elements (e.g., hygroscopic elements 28, 30). In some embodiments, a single opening can permit rainfall to access two or more hygroscopic elements in the housing 26. In some embodiments, the rain sensor 20 includes one or more sensors (e.g., radiation sensor 76, temperature sensors, light sensors, pressure sensors) configured to monitor one or more environmental conditions.

Figure 1B:
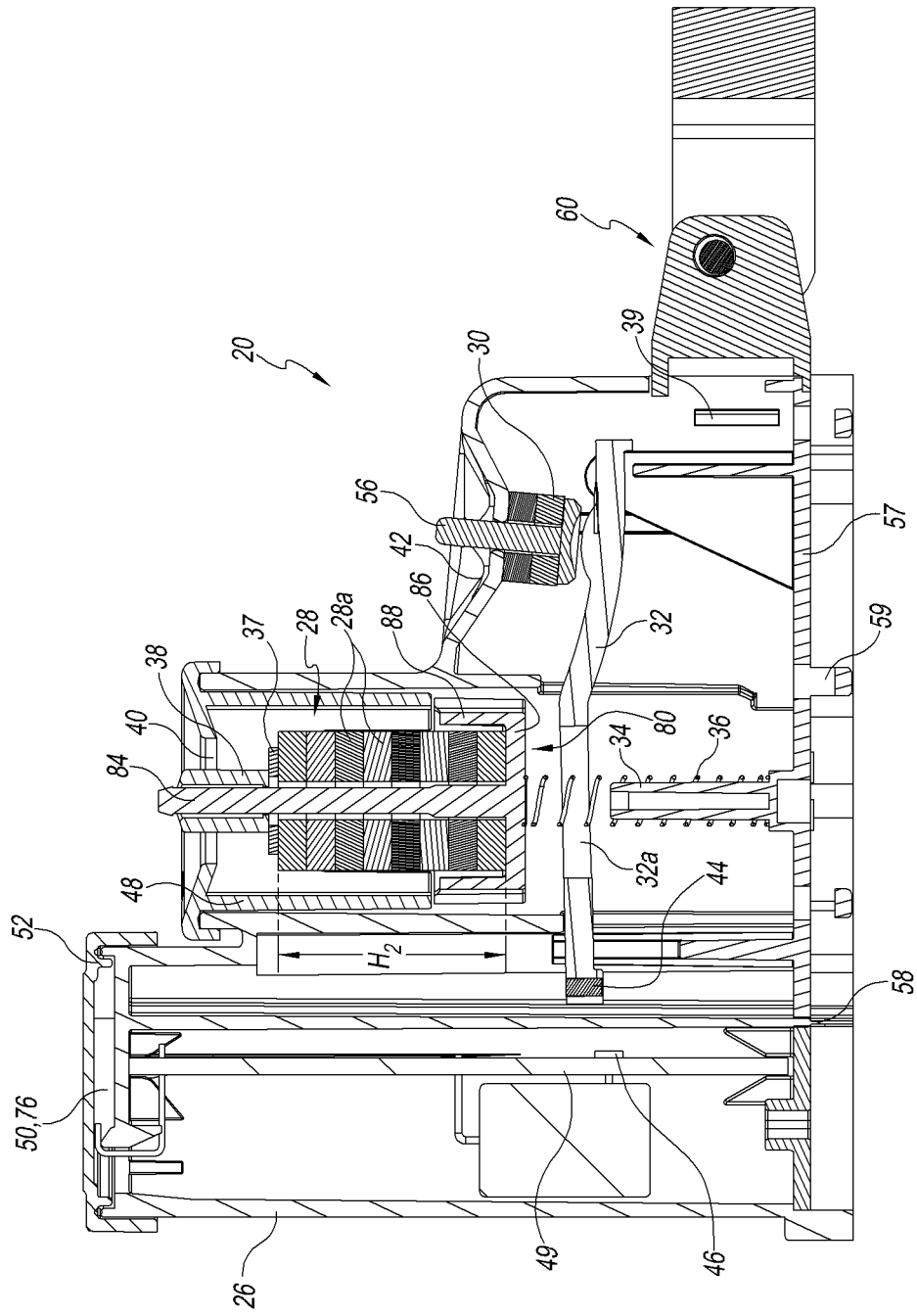
FIG. 1B is a cross-section view of the sensor of FIG. 1A.

FIGS. 1A-1B illustrate an embodiment of a rain sensor 20 that is able to measure the actual distance of travel of a mechanical linkage associated with one or more hygroscopic members utilizing an electronic sensing device, such as a Hall effect sensor. Programming executed by a microcontroller enables intelligent decisions based on both the amount of swelling or expansion of the hygroscopic material and its rate of expansion.

Referring to FIGS. 1A-1B, a sensor 20 (e.g., a rain and/or freeze sensor) incorporates an embodiment of the rain sensor of the present disclosure. The rain and freeze sensor 20 measures ambient air temperature, and detects a rain event.

The rain and freeze sensor 20 is a one-piece unit that can readily attach to an exterior side of a building structure, a fence, a rain gutter, or other structure. The rain and freeze sensor 20 can be hard wired to an irrigation controller (not illustrated) via cable (not illustrated), or the communications between the rain and freeze sensor 20 and the irrigation controller may take place via wireless communications link including a transmitter and antenna (not shown). The basic construction of the rain and freeze sensor 20 is somewhat similar to that disclosed in U.S. patent application Ser. No. 12/181,894 filed by Peter J. Woytowitz et al. on Jul. 29, 2008 and entitled "Irrigation System with ET Based Seasonal Watering Adjustment," the entire disclosure of which is hereby incorporated herein with particular reference to FIG. 12A and the associated description which discloses a stand-alone weather station with a Hall effect sensor that generates a signal representative of the position of a permanent magnet moved by stacks of hygroscopic discs. See also U.S. Pat. No. 6,570,109 granted May 27, 2003 to Paul A. Klinefelter et al. entitled "Quick Shut-Off Extended Range Hygroscopic Rain Sensor for Irrigation Systems," and U.S. Pat. No. 6,977,351 granted Dec. 20, 2005 to Peter J. Woytowitz entitled "Moisture Absorptive Rain Sensor with Sealed Position Sensing Element for Irrigation Watering Program Interrupt," the entire disclosures of both of which are incorporated herein by reference.

The rain and freeze sensor 20 includes an outer housing 26 (e.g., injection molded plastic housing) that encloses a pair of moisture absorbing members in the form of a taller stack 28 of hygroscopic discs 28a and a shorter stack 30 of hygroscopic discs. In some embodiments, both stacks 28, 30 have the same or similar heights. The housing 26 can include a pair of vertical slots 39 configured to receive a portion of a mounting bracket assembly 60. As illustrated in FIG. 1A, the housing 26 can include one or more openings (e.g., slots 29) configured to facilitate ventilation of the interior of the housing 26. In some embodiments, only the taller stack 28 of hygroscopic discs is included in the housing 26. The discs in the taller stack 28 can have a slightly larger diameter than the discs in the smaller stack 30. In some embodiments, the discs in the smaller stack 30 have a larger diameter than the discs in the taller stack 28. These discs can be made of untreated wood fibers pressed together into a material that resembles cardboard in appearance. Other water-absorbent materials are possible. For example, other materials which exhibit desirable expansion characteristics can include inorganic materials (e.g., nylon or other materials) configured to expand when saturated with moisture. The members 28, 30 can be configured to expand in the linear direction (e.g., linearly parallel to the mounting rods/shafts 56, 84) more than in the radial direction (e.g., perpendicular to the axis of the mounting rods/shafts 56, 84). In some embodiments, the members 28, 30 are configured to expand uniformly in a plurality of directions.

Additionally, other shapes are possible for the moisture-absorbing members, such as spheres, polygonal blocks, toroids, or other suitable shapes. In some embodiments, each member 28, 30 comprises a single moisture-absorbent element. In some embodiments, each member 28, 30 comprises a plurality of moisture-absorbent elements having uniform or varying sizes and shapes.

The term "hygroscopic" as used herein is intended to be broadly construed to cover any water-swellable material that can absorb rain drops and physically expand a sufficient amount for reasonably accurate detection by a suitable electronic sensor. One suitable commercially available hygroscopic material is Kraft Press Board which is made from cellulose pulp. Suitable water-swellable polymers and other hygroscopic materials are disclosed in U.S. Pat. No. 4,655,076 granted Apr. 7, 1987 to Weihe et al., the entire disclosure of which is hereby incorporated by reference. Preferably, materials used for the elements 28, 30 are able to expand a measurable amount when wet, able to return to a consistent size when dry (e.g., consistent size in one or more direction), able to expand (e.g., wet) and contract (e.g., dry) in a repeatable and consistent manner over a significant number (e.g., dozens, hundreds, or thousands) of wet/dry cycles, able to expand quickly when exposed to moisture (e.g., water), able to absorb a sufficient amount of moisture to remain wet for a sufficient amount of time (e.g., hours or days), able to resist algae or other biological growth (e.g., mold), and/or able to resist decomposition for an extended period of time (e.g., greater than 3, 5, or 10 years).

The stacks 28 and 30 of hygroscopic discs are supported over a common swing arm 32 for vertical reciprocal motion relative to a vertical shaft 34. A coil spring 36 extends through an aperture 32a in the swing arm 32 surrounding the shaft 34 and normally pushes the stack 28 upwardly against an upper retaining structure (e.g., a stop 38 or retention ring 37). A torsion spring (not illustrated) associated with the pivot axis (not illustrated) of the swing arm 32 lifts the swing arm 32 and the stack 30 upward to another fixed stop (not illustrated).

The housing 26 can include one or more apertures on its upper surface. For example, the housing 26 can have a first aperture 40 and a second aperture 42. A crosspiece 53 can span the first aperture 40. One or both of the apertures 40, 42 can include a funnel portion. When rain water enters the housing 26 via first aperture 40 and second aperture 42, the hygroscopic discs of the stacks 28 and 30 absorb water and swell, pushing the swing arm 32 downward. A permanent magnet 44 is mounted on one end of the swing arm 32. A stationary linear Hall effect sensor 46 has its electrical contacts soldered to conductive traces on a vertically mounted printed circuit board 49. The Hall effect sensor is mounted adjacent the permanent magnet 44 and generates a signal representative of the position of the magnet 44 that is proportional to the amount of expansion of the stacks 28 and 30 caused by rain water entering the rain and freeze sensor 20. The Hall effect sensor 46 may be part number A1395SEHLT-T commercially available from Alegro. The small stack 30 can absorb water quickly via second aperture 42 so that a rain event will be quickly detected. In some embodiments, the large stack 28 can dry out slowly so that the rain interrupt signal from the rain and freeze sensor 20 will not be terminated too quickly as the hygroscopic discs dry out. For example, each of the large stack 28 and the small stack 30 can have a drying rate, the drying rate of the large stack 28 being slower than the drying rate of the small stack 30.

A shaft 56 extends through the centers of the discs of the shorter stack 30. The upper end of the shaft 56 can be depressed with a fingertip to run a test of the device. A vertical wall or baffle 58 inside the housing 26 provides a water-tight seal between the portion of the rain and freeze sensor 20 containing the stacks 28 and 30 and the portion of the rain and freeze sensor 20 containing the printed circuit board 49. The portion of the housing 26 containing the printed circuit board 49 can be potted with a water resistant material (not illustrated) to further protect the circuitry of the rain and freeze sensor 20.

As illustrated in FIGS. 1A-1B, a solar radiation sensor 76 may be mounted in a receptacle 50 (FIG. 1B) inside a transparent cap or cover 52 that fits over a portion (e.g., high portion or the highest portion) of the housing 26. As illustrated, the circuit board 49 is protected from outside elements by the cap or cover 52. In some embodiments, the cap or cover 52 is opaque. In some embodiments, other sensors (e.g., a temperature sensor, pressure sensor, light sensor) may be integrated with the rain and freeze sensor 20.

The rain and freeze sensor 20 uses the combination of the motion of a permanent magnet caused by the swelling of hydroscopic discs, and an adjacent Hall effect sensor to detect rain. At the same time, pre-programmed algorithms provide protection from false triggering, e.g. rain shut off commands that would otherwise be generated by ambient environmental conditions other than steady measurable rainfall, e.g. dew, a light sprinkle or high humidity. In the presence of an actual rain drop, or several rain drops, the hygroscopic discs in the stacks 28 and 30 swell rapidly and cause a relatively fast motion of the arm. In the presence of dew, high humidity or a light sprinkle the swelling that occurs is slower and results in a relatively slow motion of the swing arm 32. The relative position of the permanent magnet 44 carried on the remote end of the swing arm 32 can be determined based on the output of the Hall effect sensor 46. Dew, high humidity and/or a light sprinkle can be differentiated from measurable rainfall by determining both the distance the magnet 44 moves and the speed or rate which the magnet 44 moves. The speed of movement of the remote end of the swing arm 32 and the magnet 44 carried thereby can be ascertained by taking the derivative of its position. In some embodiments, it may be desirable to use less processing to reduce the drain on the battery cell (not shown). Examples of algorithms and systems used in combination with the rain freeze sensor are disclosed in U.S. patent application Ser. No. 12/783,038 filed by Peter J. Woytowitz et al. on May 19, 2010 and entitled "Rain Sensor with Variable Shut Off," the entire disclosure of which is hereby incorporated by reference. Said application was published Nov. 24, 2011 under Publication No. US2011/0288775 A1.

Figure 1C:
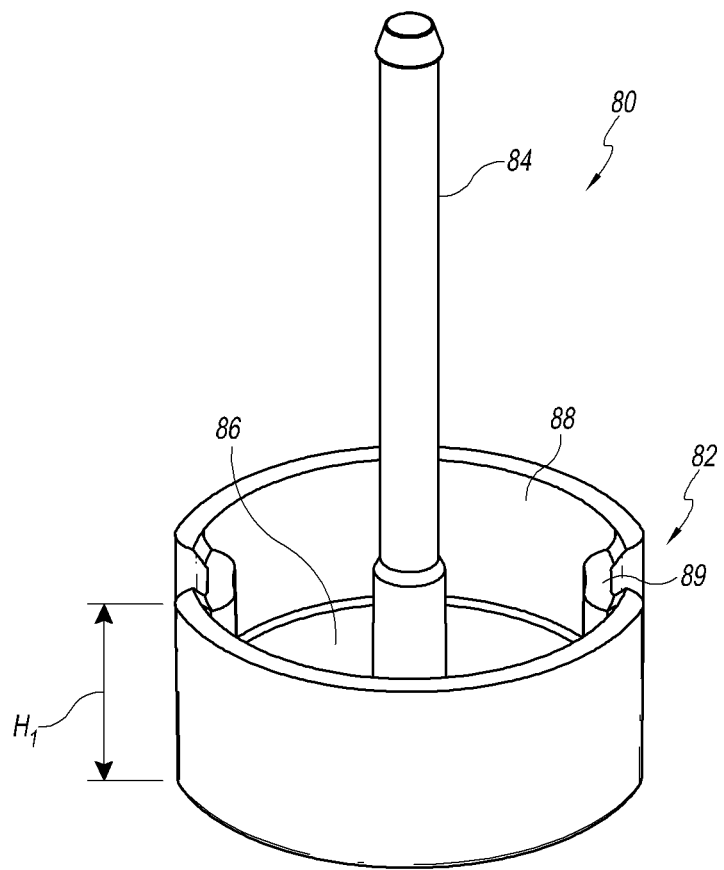
FIG. 1C is a perspective view of an embodiment of a moisture basin.

In some embodiments, the sensor 20 can include a moisture basin 80 (a best seen in FIG. 1C). The basin 80 can include a cup portion 82 for accepting and/or containing moisture (e.g., rain, condensation, etc.). The moisture basin 80 can include an attachment portion 84 (e.g., a rod, a tab, or some other structure) for attaching the moisture basin 80 to a portion of the housing 26. Although the moisture basin 80 is described herein in the combination with certain sensor embodiments having one or more hygroscopic elements, it will be understood that the moisture basin 80 may be used in combination with additional and/or alternative structures or applications.

The cup portion 82 can include a cup base 86. The cup base 86 can be substantially flat. In some embodiments, the cup base 86 has a convex or concave shape. The cup wall 88 can extend upward from cup base 86 (e.g., from the outer periphery of the cup base 86). The cup wall 88 can extend vertically from the cup base 86 or at some angle with respect to vertical. For example, portions of the cup wall 88 can extend toward or away from a center of the cup base 86. In some embodiments, the cup wall 88 is segregated into two or more sections along the periphery of the cup wall 88. For example, one or more portions of the cup wall 88 can be taller than or shorter than other portions of the cup wall 88. In some embodiments, one or more notches, protrusions, or other wall features can delineate sections of the cup wall 88.

Figure 1D:
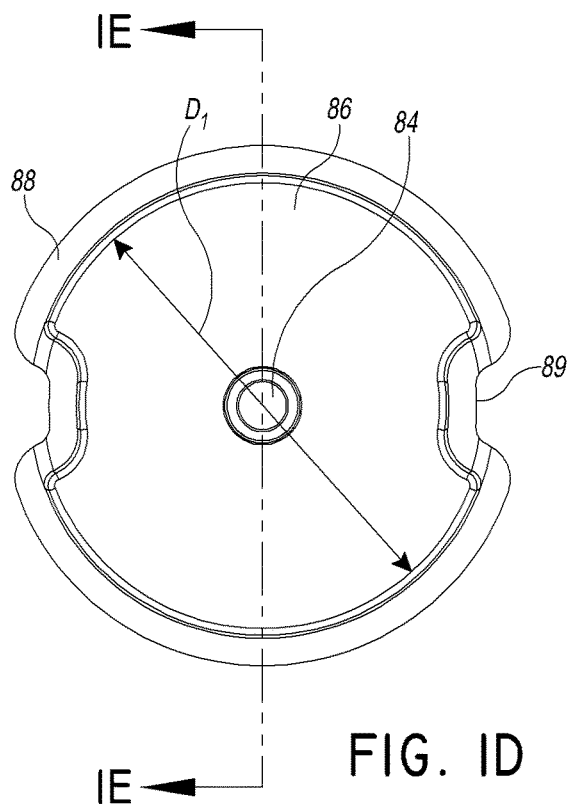
FIG. 1D is a top plan view of the moisture basin of FIG. 1C.
Figure 1E:
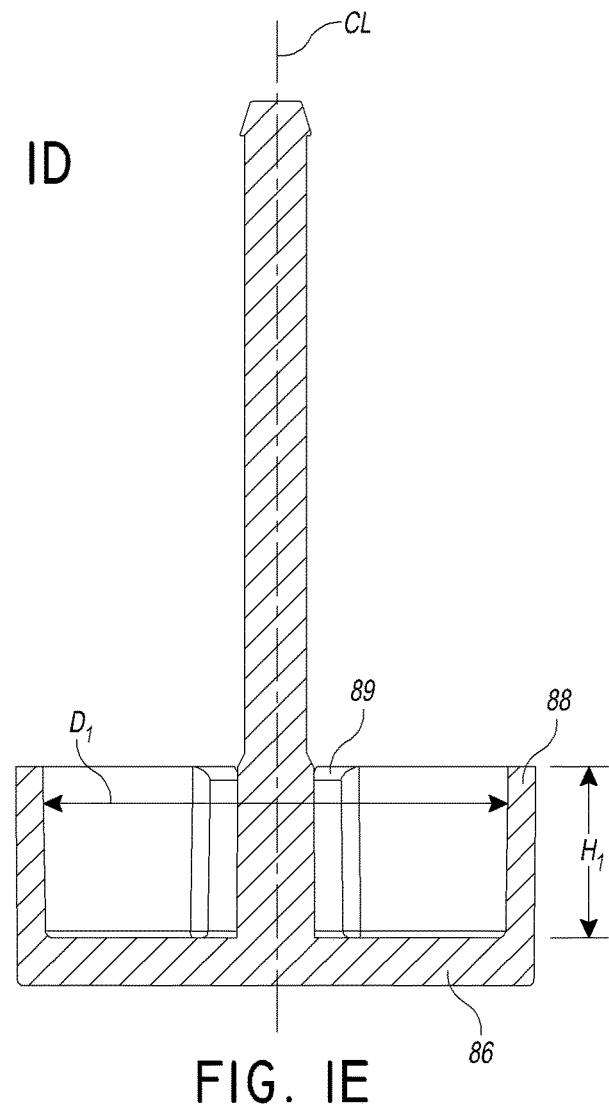
FIG. 1E is a cross-section view of the moisture basin of FIG. 1C along the cut-plane E-E of FIG. 1D.

The cup wall 88 can have a wall height H1. As illustrated in FIGS. 1D and 1E, the cup wall 88 can have a cup diameter D1. The cup wall 88 and cup base 86 can form a cup volume. In the illustrated embodiments, the cup volume is defined by wall height H1 and the cup diameter D1. The cup portion 82 (e.g., the wall 88 and base 86) can be water-impervious such that the cup portion 82 retains a volume of water therein.

The cup wall 88 can include one or more notches 89 or other surface features that facilitate water flow between the outer surface of the cup wall 88 and an inner surface of the housing 26 (e.g., water that overflows out of the cup volume). As illustrated in FIG. 1B, the housing 26 can include one or more apertures 59 in a bottom wall 57 of the housing 26. The apertures 59 can be configured to inhibit accumulation of water in the housing 26 outside of the cup 82.

The moisture basin 80 can include an attachment portion 84 configured to connect (e.g., moveably) the moisture basin 80 to a portion of the housing 26. Referring to FIGS. 1C and 1E, a mounting rod 84 can be connected to (e.g., adhered, welded, snap-fit, or otherwise connected to), and can extend upward from the cup base 86. In some embodiments, the mounting rod 84 and cup portion 82 are formed (e.g., injection molded, extruded) as a monolithic part. Referring to FIG. 1A, the mounting rod 84 can extend through an aperture in the crosspiece 53 when the sensor 20 is assembled.

Figure 1F:
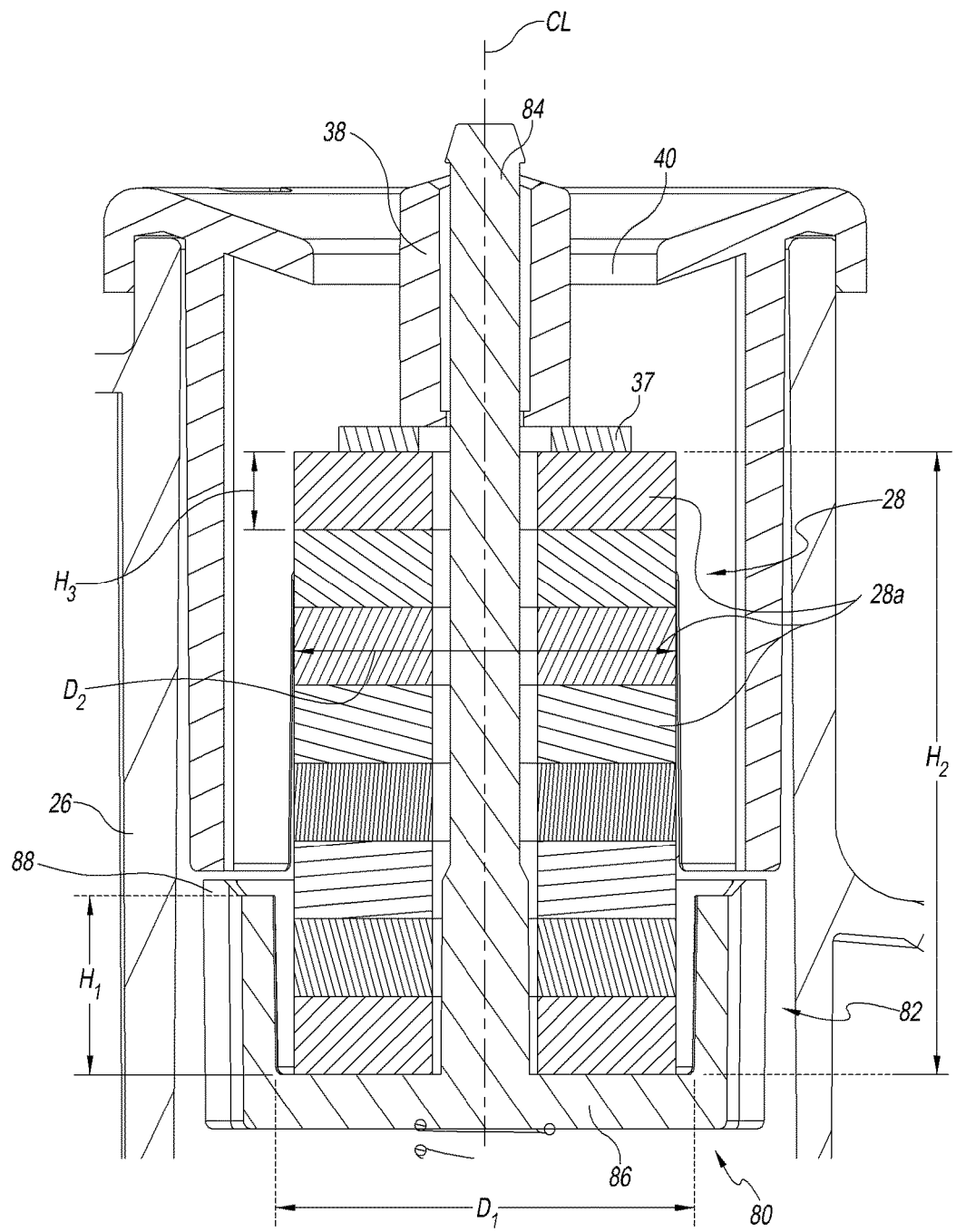
FIG. 1F is a cross-section view a moisture basin and absorbent element of the sensor of FIG. 1A.

As illustrated in FIG. 1F, the second moisture-absorbent element (e.g., the taller stack 28 of hygroscopic discs 28a) can be housed partially within the cup portion 82 of the moisture basin 80. For example, each of the discs 28a can be mounted on the mounting rod 84 such that the mounting rod 84 passes through an aperture or notch in each of the discs 28a. It will be understood that the moisture basin 80 may be used in combination with the first moisture-absorbent element and/or in combination with both the first moisture-absorbent element and the second moisture-absorbent element. In the illustrated embodiment, each of the discs 28a has a disc height H3 and a disc diameter D2. In some embodiments, each of the discs 28a has the same disc height H3 and disc diameter D2. In some embodiments, the disc height H3 and disc diameter D2 varies between two or more of the discs 28a. One or more of the discs 28a can have a rounded shape, an oval shape, a rectangular shape, or some other shape or combination of shapes.

The disc diameter D2 can be less than or equal to the diameter D1 of the cup wall 88. For example, the disc diameter D2 can be less than 70% of the diameter D1 of the cup wall 88, less than 75% of the diameter D1 of the cup wall 88, less than 80% of the diameter D1 of the cup wall 88, less than 85% of the diameter D1 of the cup wall 88, less than 90% of the diameter D1 of the cup wall 88, less than 95% of the diameter D1 of the cup wall 88, less than 98% of the diameter D1 of the cup wall 88, or some value therebetween. In some embodiments, the diameter D2 of the discs is approximately 91% of the diameter D1 of the cup wall 88. It will be understood that length and width of non-round discs can have the same or similar ratios.

One or more of the discs 28a at or near the bottom of the stack 28 can be positioned within the cup volume. For example, the disc height H3 of a lower disc 28a can be less than the wall height H1. In some embodiments, the disc height H3 (e.g., when the discs 28a are dry) of the bottom disc 28a can be less than 75%, less than 70%, less than 50%, less than 40%, less than 25%, less than 20% or less than 10% the wall height H1. In some cases, the disc height H3 is between 30% and 55% of the wall height H1. Many variations are possible.

As illustrated in FIG. 1F, the taller stack 28 can have an element height H2 (e.g., an overall height of the entire taller stack 28 or the sum of the disc heights H3). The wall height H1 can be greater than the element height H2. In some embodiments, the wall height H1 is less than the element height H2. For example, the wall height H1 can be less than 50%, less than 45%, less than 35%, less than 25%, less than 20% or less than 15% of the element height H2 (e.g., when the discs 28a are dry). In some embodiments, the wall height H1 is between 20% and 40% of the element height H2. In some embodiments, the wall height H1 is approximately 30% of the element height H2. Many variations are possible.

The dimensions of the cup portion 82 with respect to the dimensions of the stack 28 can vary depending on the material characteristics of the stack 28. For example, when the stack 28 is able to absorb a high amount of water and has a longer dry-out time, the height H1 of the cup wall 88 may be shorter than embodiments wherein the stack 28 is able to absorb less water and has a shorter dry-out time. In some embodiments, dimensions of the cup portion 82 can be adjusted to account for soil moisture-absorption properties. For example, highly-absorbent soil applications (e.g., deep topsoil and/or flat topography) may warrant a cup 82 having greater sidewall height H1 than an application with less-absorbent soil (e.g., high sand or gravel content and/or sloped topography).

The cup portion 82 can retain water when the taller stack 28 is fully saturated. The retained water (e.g., excess water) within the cup portion 82 can maintain the hygroscopic discs 28a of the taller stack 28 in a saturated state (e.g., wet state) for a period of time after rainfall has stopped. The discs 28a can be manufactured from a material that facilitates rapid wicking between the separate discs 28a. Such wicking characteristics could facilitate transfer of moisture from the cup portion 82 to a substantial portion of the taller stack 28 (e.g., transfer of moisture to a plurality of discs 28a).

The moisture basin 80 can simulate soil saturation in high-precipitation environments. For example, over a given period of time, heavy rainfall can cause higher levels of water saturation in the ground than would occur if the rainfall were light. Similarly, for a given intensity of rain, a longer rainfall period can cause higher levels of water saturation in the ground than would occur if the rainfall continued for a shorter period of time. The moisture basin 80 simulates these water saturation phenomena by retaining excess water when the taller stack 28 is fully saturated with water.

Figure 2B:
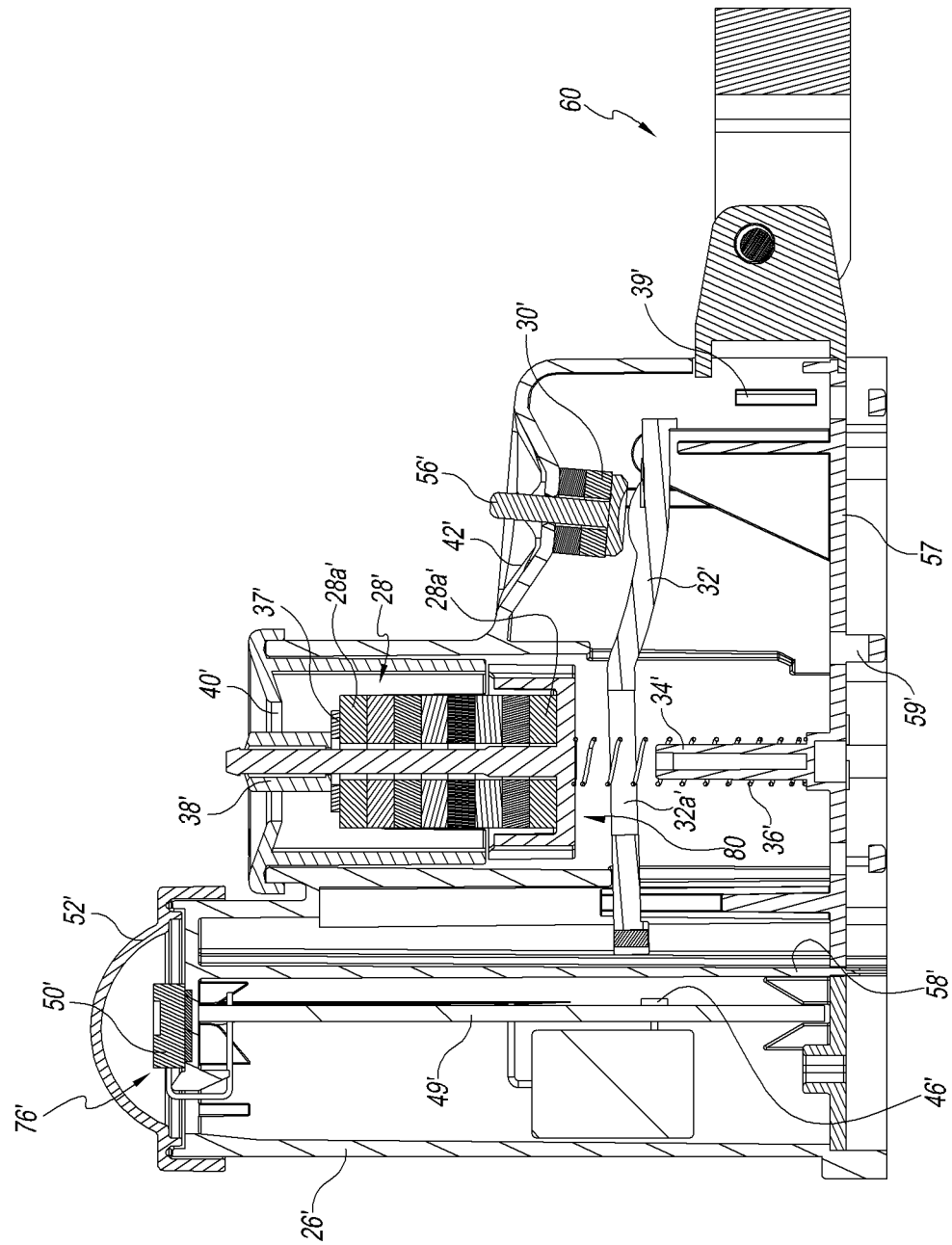
FIG. 2B is a cross-section view of the sensor of FIG. 2A.

FIGS. 2A-2B illustrate an embodiment of a rain sensor 20' that can have components or portions that are the same as or similar to the components or portions of the rain sensor 20. In some embodiments, the rain sensor 20' includes a first absorbent element 30' and a second absorbent element 28'. Some numerical references correspond to components in FIGS. 2A-2B that are the same as or similar in structure and/or function to those previously described for the rain sensor 20 (e.g., swing arm 32 v. swing arm 32'). It is to be understood that the components can be the same in function or are similar in function to previously-described components. The sensor 20' shows certain variations to the sensor 20. For example, the sensor 20' can include a dome-shaped cap or cover 52'. In some embodiments a sensor 76' (e.g., a radiation sensor, a temperature sensor, a pressure sensor, or some other sensor or combination of sensors) can be positioned within a receptacle 50' under the dome-shaped cover 52'. The dome-shape of the cover 52' can facilitate efficient absorption of solar radiation by the sensor 76'.

Figure 3A:
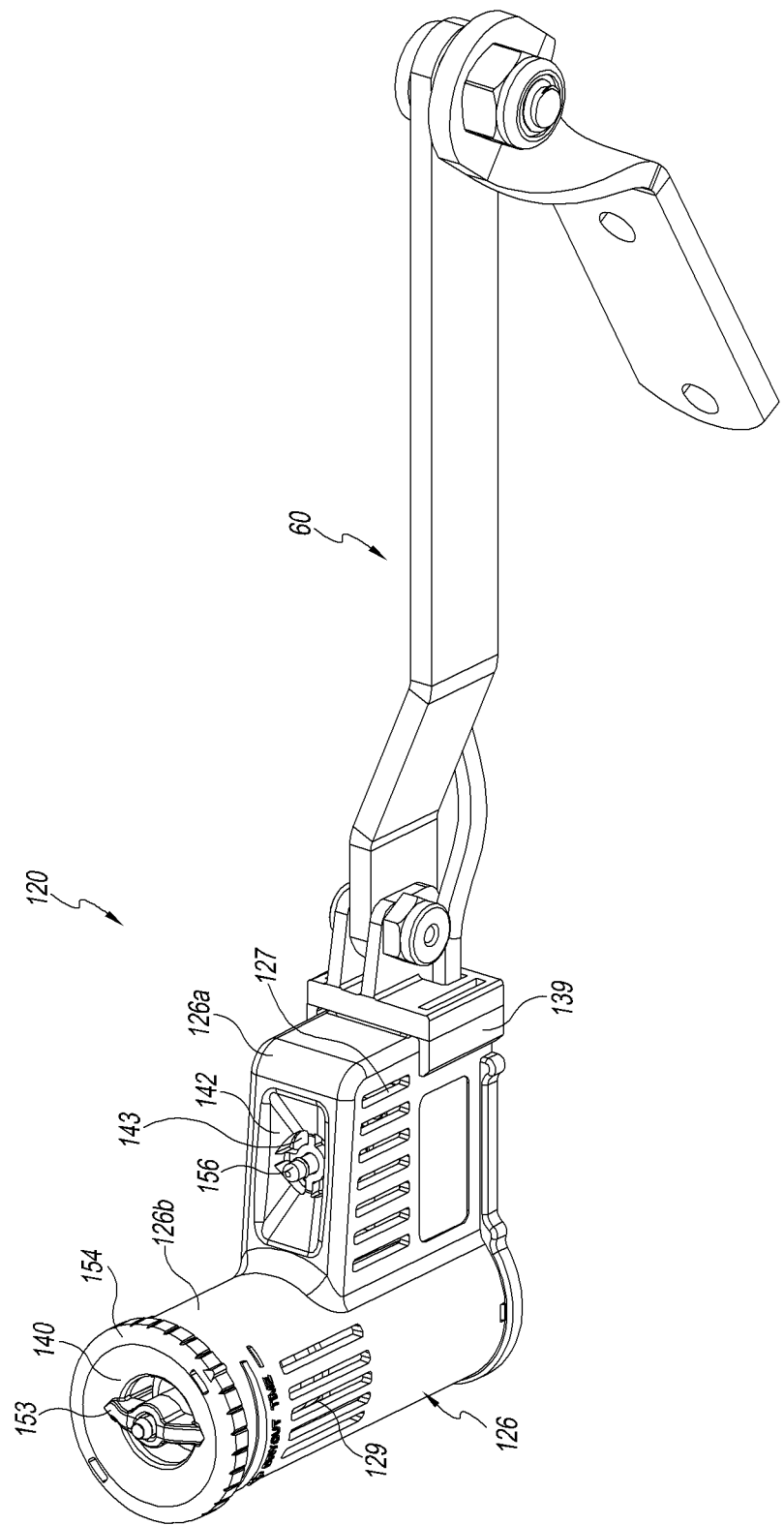
FIG. 3A is a perspective view of another embodiment of a rain sensor.
Figure 3B:
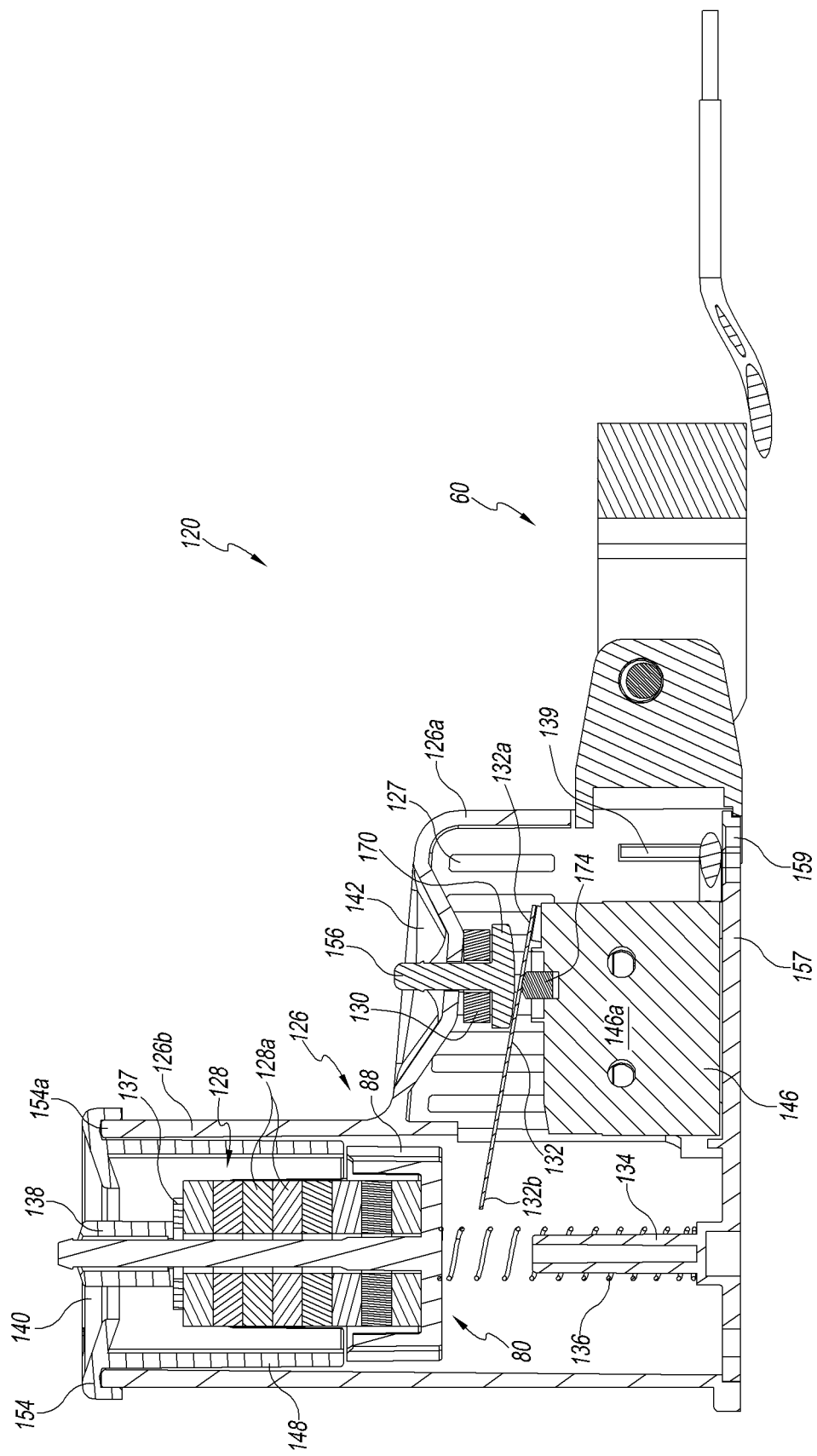
FIG. 3B is a cross-section view of the sensor of FIG. 3A.

Referring to FIGS. 3A-3B, an embodiment of a rain sensor 120 includes a housing 126 and an electric switch 146 mounted within the housing 126. The switch 146 has a spring biased actuating member in the form of a lever 132 that is movable by pivoting or swinging between a first position in which the switch is in a first state and a second position in which the switch is in a second state. A first moisture absorbent element 130 (e.g., a single hygroscopic disc) is mounted within the housing 126 beneath a plurality of first openings 143 in a funnel shaped basin 142 formed an upper side of the housing 126 for receiving rainfall. The basin 142 collects rainfall and directs it to the first moisture absorbent element 130. The first moisture absorbent element 130 rapidly expands vertically a sufficient amount to move the actuating lever 132 of the switch 146 from its first position to its second position. A second moisture absorbent element 128 (e.g., a stack of eight individual hygroscopic discs 128a) is mounted in the housing 126 for receiving rainfall through a first aperture 140 in an upper side of the housing 126 for slowly expanding and maintaining the actuating lever 132 of the switch 146 in its second position after the first moisture absorbent element 130 has dried and contracted.

The switch 146 is preferably a conventional water-proof micro-switch except that its actuating lever 132 is extended well beyond the rectangular base 146a of the switch 146. This configuration avoids limiting the range of expansion of the second moisture absorbent element 128 to the "over-travel" distance inherent in the micro-switch. The switch 146 is in an open state when in its first position in which the outer end actuating lever 132 is at or near its maximum height. This open state is sensed by the electronic irrigation controller as an ON position. Conversely, the switch 146 is in a closed state when in its second position in which the actuating lever 132 has been moved downwardly through a predetermined angle. This closed state is sensed by the electronic irrigation controller as an OFF position. It is important to understand that the actuating lever 132 is made of resilient flexible metal. The first moisture absorbent element 130 is positioned closely adjacent to the hinged inner end 132a of the actuating lever 132 so that its rapid vertical expansion is sufficient to depress the inner end 132a of the actuating lever 132 enough to move the lever 132 to its OFF position. The second moisture absorbent element 128 expands more slowly and eventually its vertical expansion is sufficient to push the outer end 132b of the lever 132 and hold it down for a prolonged period, even after the first moisture absorbent element 130 has dried out. With the presently disclosed device, the rain sensor 120 thus stays OFF in better proportion to the total amount of rain received over the course of a day or several days.

The housing 126 is preferably made of injection molded plastic and includes a hollow rectangular portion 126a that encloses the switch 146 and first moisture absorbent element 130 and a taller cylindrical portion 126b that encloses the second moisture absorbent element 128. As illustrated in FIGS. 3A-3B, the hollow interior of the rectangular portion 126a of the housing 126 communicates with the hollow interior of the cylindrical portion 126b of the housing 126. The long actuating lever 132 extends from the rectangular housing portion 126a into the cylindrical housing portion 126b. The rectangular housing portion 126a is formed with a plurality of vertical slots 127 on opposite sides thereof. The cylindrical housing portion 126b is formed with a plurality of vertical slots 129 on opposite sides thereof. The slots 127 and 129 facilitate ventilation to allow the first moisture absorbent element 130 and the second moisture absorbent element 128 to dry out once the rainfall has ceased. Holes 159 formed in the bottom wall 157 of the housing 126 allow rainfall that has entered the holes 143 and 140 and has not been absorbed by the moisture absorbent elements 130/128/ 128a or retained by the moisture basin 80 to flow out of the housing 126. The housing portions 126a and 126b are preferably integrally formed and snap onto the bottom wall 157 to facilitate opening the rain sensor 120 to repair or replace its internal parts.

A pair of vertical slots 139 are formed in opposite side walls of the rectangular housing portion 126a for facilitating attachment to a pivoting mounting extension bracket 60. This facilitates mounting the rain sensor 120 in the outdoors, to an exterior structure, such as the outside wall of a garage or a fence. The rain sensor 120 is preferably mounted close to the irrigation controller so that only a short length of double stranded wire need be used to make the required electrical connection between the terminals of the switch 146 and the circuitry of the controller.

The first moisture absorbent element 130 and the plurality of hygroscopic discs 128a that make up the second moisture absorbent element 128 are preferably the same thickness, and are made of the same hygroscopic material. However, the first moisture absorbent element 130 and the discs 128a have different diameters. A material that is a mixture of untreated wood fibers compressed together to form what looks like brown cardboard has been found to have the correct water absorption, expansion and contraction properties, as well as durability. One suitable commercially available material is Kraft Press Board, refined from one-hundred percent pure cellulose pulp.

The second moisture absorbent element 128 is supported by the moisture basin 80 in a manner similar or identical to that described above with respect to element 28. A vertical guide stop 134 extends upwardly from the bottom wall 157 in the center of the cylindrical portion 126b of the housing 126. A coil spring 136 surrounds the vertical guide stop 134 and is compressed between the bottom wall 157 and the base 86 of the cup portion 82 to bias the second moisture absorbent element 128 upwardly. An inner cylindrical mounting sleeve 148 snugly and slidingly fits within the upper portion of the cylindrical portion 126b of the housing 126. A circular knob 154 is integrally molded to, and extends across the upper end of, the cylindrical mounting sleeve 148. The knob 154 is formed with a downwardly opening annular groove 154a for receiving the upper end of the housing portion 126b. The mounting sleeve 148 preferably has cut away regions that allow the knob 154 to be rotated to vary the number of the vertical slots 129 that are covered. This permits the user to select quicker or longer dry-out times.

The first aperture 140 (e.g., a substantially circular opening) is formed in the knob 154 and allows rainfall to enter the cylindrical housing portion 126b and be absorbed by the second moisture absorbent element 128. The hygroscopic discs 128a are formed like washers, i.e. they each have a center hole. A cross-piece 153 extends diametrically across the first aperture 140. A centrally located cylindrical guide piece 138 extends downwardly from the cross-piece 153 and receives the upper end of the mounting rod 84. A washer 137 is first installed over the mounting rod 84 after the washer shaped hygroscopic discs 128a are installed over the rod 84 to form the second moisture absorbent element 128. The cup base 86 of the moisture basin 80 pushes the second moisture absorbent element 128 and the washer 137 against the guide piece 138.

The first moisture absorbent element 130 has a washer shape. An upwardly opening cylindrical mounting dish 170 surrounds the lower end of the first moisture absorbent element 130. A pin 156 with a flared upper end extends through the central opening (not visible) in the first moisture absorbent element 130. The lower end of the pin 156 is threaded, welded, glued or otherwise secured to the mounting dish 170. In some embodiments, the pin 156 and mounting dish 170 are formed as a monolithic part. The flared upper end of the pin 156 is forced through a small hole in a central portion of the housing 126 that is supported by a plurality of ribs that define the rainfall openings 143 in the funnel shaped basin 142. The upper end of the pin 156 is flared so that it can he forced through the small hole but cannot be easily pulled out of the hole. The switch 146 is mounted in the rectangular portion 126a of the housing 126 beneath the basin 142 so that when the first moisture absorbent element 130 expands the it will push the dish 170 against the upper side of the hinged inner end 132a of the switch actuating lever 132. The lower side of the inner end 132a will eventually depress a spring biased push button 174 of the switch 146 a sufficient amount to turn the switch 146 to its OFF state. As the first moisture absorbent element 130 expands and contracts it is free to slide along the length of the shaft of the pin 156 which extends through the hole in the center of the first moisture absorbent element 130.

In some embodiments, the mounting sleeve 148 (and/or mounting sleeve 48) can have a height-adjusting feature for changing the vertical position of the guide piece 138 and/or washer 137 relative to the bottom wall 157 of the housing 126. Examples of height-adjusting features for the mounting sleeves 48, 148 are disclosed in U.S. Pat. No. 6,570,109 filed by Paul A. Klinefelter et al. on Oct. 6, 2001 and entitled "Quick Shut-Off Extended Range Hygroscopic Rain Sensor For Irrigation Systems," the entire disclosure of which is hereby incorporated herein by reference.

The rain sensors 120 can provide a quick turn OFF feature. For example the first moisture absorbent element 130 can be configured to need to absorb a relatively small amount of rainfall to expand sufficiently to depress push button 174 to change the state of the switch 146. This can occur during the first five to ten minutes of a storm. On the other hand, as more and more rain falls during the storm, the second moisture absorbent element 128 will eventually absorb enough rainfall, e.g. over a two to four hour time period, to hold down the outer end 132b of the switch lever 132 to maintain the switch 146 in its OFF state, even after the first moisture absorbent element 130 has dried out and contracted to the point where it would no longer hold the switch 146 in its OFF state. The first and second water absorbent elements 130 and 128 are laterally spaced apart and expand and contract vertically.

The hygroscopic discs 128a in the second moisture absorbent element 128 absorb water and expand proportionally to the amount of rain that fell. For example, a small cloudburst would result in little absorption, and a thunderstorm with two inches of rainfall would lead to much more absorption and expansion. Of course, dry-out time for the second moisture absorbent element 128 depends upon the relative temperatures, humidity and wind conditions. However, this is beneficial since there is a direct correlation between dry-out time and the need to re-commence watering to avoid damage to the turf or other landscaping due to insufficient ground water. If only the first moisture absorbent element 130 were utilized, the irrigation controller would allow watering to re-commence way too soon. If only the second moisture absorbent element 128 were utilized, it would take too much rain and/or too long before watering were interrupted The housing 126, sleeve 148 and knob 154 can be inexpensively injection molded from suitable UV resistant thermoplastic material. The water-proof micro-switch 146 can be purchased commercially from many different vendors with the custom, extended length actuating lever 132 specified for this special application. In other words, the actuating lever 132 extends well beyond the perimeter of the rectangular base 146a of the switch 146. The hygroscopic discs of elements 130 and/or 128 can be die-cut from sheet stock of the same hygroscopic material.

FIG. 4 illustrates an embodiment of a rain sensor 120' that can have components or portions that are the same as or similar to the components or portions of the rain sensor 120'. In some embodiments, the rain sensor 120' includes an absorbent element 128'. Some numerical references correspond to components in FIG. 4 that are the same as or similar in structure and/or function to those previously described for the rain sensor 120 (e.g., switch 146 v. switch 146'). It is to be understood that the components can be the same in function or are similar in function to previously-described components.

The sensor 120' shows certain variations to the sensor 120. For example, the sensor 120' can operate as a rain sensor without use of use of a lever or arm. As illustrated, the cup base 86 of the moisture basin 80 can contact (e.g., directly touch) the push button 174' of the switch 146'. In some embodiments, the cup base 86 of the sensor 120' can include a concave portion configured to interact with the push button 174'. Interaction between the concave portion of the cup base 86 and the push button 174' can reduce the likelihood that the moisture basin 80 and/or absorbent element 128' move out of alignment with (e.g., tilt with respect to) the push button 174'. In some embodiments, expansion of the absorbent element 128' brings the top of the absorbent element 128' into contact with washer 137' and/or with the cross-piece 153'. Contact with washer 137' and/or with the cross-piece 153' can direct expansion of the absorbent element 128' in the downward direction. Downward expansion of the absorbent element 128' can push the cup base 86 against the push button 174' to actuate the switch 146'. As illustrated in FIG. 4, the sensor 120' can operate with a single absorbent element 128'. In some embodiments, additional absorbent elements are included in the sensor 120'. The sensor 120' can include one or more mounting structures 139' (e.g., brackets, notches, slots) for mounting the sensor 120' onto another structure.

While we have described and illustrated in detail embodiments of a rain sensor with a moisture basin 80, it should be understood that our disclosure can be modified in both arrangement and detail. For example, the moisture basin 80 can be used in rain sensors utilizing reed switches and other types of electrical and/or mechanical switches. Although the moisture basin 80 has been described in conjunction with the taller element 28, 28', 128, it is also possible to use a moisture basin in conjunction with the short element 30, 30', 130. In some embodiments, a moisture basin is used in conjunction with each hygroscopic element. Therefore the protection afforded our disclosure should only be limited in accordance with the following claims.

What is claimed is:
1. An irrigation control system comprising:
a control unit; and
a rain sensor in communication with the control unit, the rain sensor comprising:
a sensor housing;
a first moisture-absorbent element within the sensor housing and in communication with ambient via a first aperture in the sensor housing, the first moisture-absorbent element configured to expand to a wet state from a dry state as the first moisture-absorbent element absorbs liquid, the first moisture-absorbent element having a first drying rate;
a moveable accumulator cup configured to move within the sensor housing, the accumulator cup having a liquid-impervious base and one or more liquid-impervious sidewalls extending upward from the base, the liquid-impervious base and one or more liquid-impervious sidewalls forming a cup volume;
a second moisture-absorbent element within the sensor housing and positioned at least partially within the cup volume, the second moisture-absorbent element in communication with ambient via a second aperture in the sensor housing, the second moisture-absorbent element configured to expand when transitioned from a dry state to a wet state, the second moisture-absorbent element having a second drying rate slower than the first drying rate, wherein the moveable accumulator cup is configured to transition between a first position and a second position with respect to the sensor housing in response to transition of the second moisture-absorbent element between the dry state and the wet state; and
a signal actuator configured to transition between a first position and a second position, the signal actuator biased to the first position when the moveable accumulator cup is in its first position, the signal actuator transitions to the second position when one or more of the first moisture-absorbent element and the second moisture-absorbent element is in its wet state;
the accumulator cup configured to store a volume of liquid in excess of the liquid within the fully saturated second moisture-absorbent element, the volume of excess liquid in contact with at least a portion of the second moisture-absorbent element.

2. The system of claim 1, wherein the one or more liquid-impervious sidewalls have a sidewall height, the second moisture-absorbent element has an element height extending between the base of the accumulator cup and an upper retaining structure, and when the second moisture-absorbent element is dry the sidewall height is less than forty percent the element height and greater than five percent the element height.

3. The system of claim 2, wherein the second moisture-absorbent element comprises a plurality of stacked moisture-absorbent discs.

4. The system of claim 1, wherein the one or more liquid-impervious sidewalls have a sidewall height, the second moisture-absorbent element has an element height extending between the base of the accumulator cup and an upper retaining structure, and the sidewall height is greater than ten percent the element height and less than sixty percent the element height when the second moisture-absorbent element is dry.

5. The system of claim 1, wherein the one or more liquid-impervious sidewalls include one or more notches, the one or more notches in an outer surface of the one or more liquid-impervious sidewalls to facilitate drainage of overflow liquid from the accumulator cup.

6. The system of claim 5, wherein the one or more notches are in an outer surface of the one or more liquid-impervious sidewalls to facilitate drainage of overflow liquid from the accumulator cup.

7. The system of claim 1, wherein the accumulator cup includes a central post extending upward from the liquid-impervious base, the second moisture-absorbent element mounted on the central post.

8. An irrigation control sensor comprising:
a sensor housing;
a signal actuator configured to transition between a first position and a second position, the signal actuator biased to the first position;
a moisture accumulator cup mounted in the sensor housing and defining a accumulator volume; and
a moisture-absorbent element mounted in the sensor housing and positioned at least partially within the accumulator volume, the moisture-absorbent element in communication with ambient via an aperture in the sensor housing, the moisture-absorbent element configured to expand as the moisture-absorbent element absorbs liquid and configured to move the moisture accumulator cup with respect to the sensor housing when the moisture-absorbent element expands;
the signal actuator transitioning from the first position to the second position as the second moisture-absorbent element expands;
the moisture accumulator cup retaining a volume of liquid outside the moisture-absorbent element when the moisture-absorbent element reaches a maximum liquid absorption, the volume of liquid in contact with the moisture-absorbent element.

9. The sensor of claim 8, wherein the moisture accumulator cup has one or more sidewalls having a sidewall height, the sidewall height being less fifty percent of a height of the moisture-absorbent element when the moisture-absorbent element is dry.

10. The sensor of claim 8 comprising a resilient structure configured to bias the moisture accumulator cup in an upward direction.

11. The sensor of claim 8 comprising a resilient structure, the moisture-absorbent element moving the moisture accumulator cup in an expansion direction as the moisture-absorbent element absorbs liquid, the resilient structure biasing the moisture accumulator cup in a direction substantially opposite the expansion direction.

12. The sensor of claim 8, wherein the moisture accumulator cup includes a cup base having a substantially flat upper surface, the cup base being liquid-impervious.

13. A rain sensor comprising:
a sensor housing;
a signal actuator configured to transition between a first position and a second position, the signal actuator biased to the first position;
a moisture accumulator cup defining an accumulator volume and moveably mounted in the sensor housing, the moisture accumulator cup configured to hold a volume of liquid within the accumulator volume; and
a moisture-absorbent element mounted in the sensor housing and positioned at least partially within the accumulator volume, the moisture-absorbent element in communication with ambient via an aperture in the sensor housing, the moisture-absorbent element configured to expand when transitioned from a dry state to a wet state, the moisture-absorbent element configured to move the moisture accumulator cup when transition from the dry state to the wet state;
the signal actuator to transition from the first position to the second position as the moisture-absorbent element is transitioned to the wet state from the dry state;
the moisture accumulator cup retaining the volume of liquid within the accumulator volume and outside the moisture-absorbent element when liquid is introduced to the moisture-absorbent element in the wet state, the volume of liquid in contact with at least a portion of the moisture-absorbent element;

wherein the moisture accumulator cup is configured to transition the signal actuator from the first position to the second position when the moisture-absorbent element is transitioned from the dry state to the wet state.

14. The sensor of claim 13, wherein the signal actuator comprises a hinged arm attached to the sensor housing at a hinge point, the hinged arm biased upward by a resilient element.

15. The sensor of claim 14, wherein the moisture accumulator cup is moved into contact with the hinged arm when the moisture-absorbent element expands.

16. The sensor of claim 13, wherein the signal actuator comprises a permanent magnet.

17. The sensor of claim 16, wherein the permanent magnet moves relative to a Hall effect sensor when the signal actuator is transitioned between the first position and the second position, movement of the permanent magnet affecting a signal generated by the Hall effect sensor.

18. The sensor of claim 16, wherein the permanent magnet moves relative to a reed switch when the signal actuator is transitioned between the first position and the second position, movement of the permanent magnet opening and closing the reed switch.

19. The sensor of claim 13, wherein the signal actuator is fixedly attached to the accumulator cup.

20. A rain sensor comprising:

a sensor housing;

a moisture accumulator cup defining an accumulator volume and mounted in the sensor housing, the moisture accumulator cup configured to hold a volume of liquid within the accumulator volume; and a moisture-absorbent element mounted in the sensor housing and positioned at least partially within the accumulator volume, the moisture-absorbent element in communication with ambient via an aperture in the sensor housing, the moisture-absorbent element configured to expand when transitioned from a dry state to a wet state;

the moisture accumulator cup configured to move in response to expansion of the moisture-absorbent element to exert a force upon a signal actuator as the moisture-absorbent element is transitioned to the wet state from the dry state;

the moisture accumulator cup retaining the volume of liquid within the accumulator volume and outside the moisture-absorbent element when liquid is introduced to the moisture-absorbent element in the wet state, the volume of liquid in contact with at least a portion of the moisture-absorbent element.

* * * * *